United States Patent
Hassan (10) Patent No.: US 10,540,098 B2
(45) Date of Patent: Jan. 21, 2020

(54) WORKLOAD-AWARE PAGE MANAGEMENT FOR IN-MEMORY DATABASES IN HYBRID MAIN MEMORY SYSTEMS

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 15/213,621

(22) Filed: Jul. 19, 2016

(65) Prior Publication Data

US 2018/0024750 A1   Jan. 25, 2018

(51) Int. Cl.
*G06F 3/06* (2006.01)

(52) U.S. Cl.
CPC .......... *G06F 3/0611* (2013.01); *G06F 3/068* (2013.01)

(58) Field of Classification Search
CPC .... G06F 3/0611; G06F 3/0637; G06F 3/0653; G06F 3/068
See application file for complete search history.

(56) References Cited

U.S. PATENT DOCUMENTS

| | | |
|---|---|---|
| 5,845,325 A | 12/1998 | Loo |
| 6,157,955 A | 12/2000 | Narad et al. |
| 6,195,731 B1 | 2/2001 | Bordaz et al. |
| 6,760,721 B1 | 7/2004 | Chasen |
| 6,952,664 B1 | 10/2005 | Lahiri et al. |
| 7,181,578 B1 | 2/2007 | Guha |
| 7,360,073 B1 | 4/2008 | Billstrom et al. |
| 7,434,002 B1 | 10/2008 | Zedlewski et al. |
| 7,624,381 B1 | 11/2009 | Czajkowski et al. |
| 7,774,556 B2 | 8/2010 | Karamcheti et al. |
| 7,840,397 B2 | 11/2010 | Chiou |
| 7,958,329 B2 | 6/2011 | Holt |
| 8,170,859 B1 | 5/2012 | Christensson et al. |
| 8,185,471 B1 | 5/2012 | Walker et al. |
| 8,214,191 B2 | 7/2012 | Ferren et al. |
| 8,230,395 B1 | 7/2012 | Koh et al. |
| 8,456,905 B2 | 6/2013 | Kasorla |
| 8,572,051 B1 | 10/2013 | Chen et al. |
| 8,862,588 B1 | 10/2014 | Gay |

(Continued)

OTHER PUBLICATIONS

Chi-Keung Luk, Robert Cohn, Robert Muth, Harish Patil, Artur Klauser, Geoff Lowney, Steven Wallace, Vijay Janapa Reddi, and Kim Hazelwood. Pin: building customized program analysis tools with dynamic instrumentation. SIGPLAN Not. 40, (Jun. 6, 2005), 190-200. (Year: 2005).*

(Continued)

*Primary Examiner* — Ramon A. Mercado
(74) *Attorney, Agent, or Firm* — Fish & Richardson P.C.

(57) ABSTRACT

Implementations of the present disclosure include receiving a sorted list of pages, each page corresponding to a fixed-length contiguous block of virtual memory, and being associated with a respective state, each state indicating a number of off-chip accesses determined for a respective page, and executing an application, which queries an in-memory database provided with a hybrid memory system, and, during execution of the application: identifying at least one page in the sorted list of pages as a page that is to-be-locked during execution of the application based on a threshold, and locking the at least one page in main memory to inhibit swapping of the at least one page by an operating system.

20 Claims, 5 Drawing Sheets

(56) References Cited

U.S. PATENT DOCUMENTS

| | | |
|---|---|---|
| 8,868,537 B1 | 10/2014 | Colgrove et al. |
| 8,874,846 B2 | 10/2014 | Franceschini |
| 8,880,687 B1 | 11/2014 | Chandrachari et al. |
| 8,959,611 B1 | 2/2015 | Vincent |
| 8,966,462 B2 | 2/2015 | Gounares et al. |
| 9,043,530 B1 | 5/2015 | Sundaram et al. |
| 9,304,913 B2 | 4/2016 | Dong et al. |
| 9,348,539 B1 | 5/2016 | Saxena |
| 9,626,327 B2 | 4/2017 | Eilert et al. |
| 9,652,380 B2 | 5/2017 | Byun et al. |
| 9,672,158 B2 | 6/2017 | Karamcheti et al. |
| 9,712,538 B1 | 7/2017 | Vincent et al. |
| 9,720,925 B1 | 8/2017 | Lawson |
| 9,720,967 B2 | 8/2017 | Lee et al. |
| 9,740,438 B2 | 8/2017 | Hassan |
| 9,841,914 B2 | 12/2017 | Hassan |
| 9,846,550 B2 | 12/2017 | Muralimanohar |
| 1,008,318 A1 | 9/2018 | Hassan |
| 2001/0027387 A1 | 10/2001 | Miyake et al. |
| 2003/0033431 A1 | 2/2003 | Shinomiya |
| 2004/0184340 A1 | 9/2004 | Dwarkasdas |
| 2005/0097078 A1 | 5/2005 | Lohman et al. |
| 2005/0108447 A1 | 5/2005 | Thadani |
| 2006/0059474 A1 | 3/2006 | Bhansali et al. |
| 2006/0117299 A1 | 6/2006 | Goldsmith et al. |
| 2007/0050328 A1 | 3/2007 | Li |
| 2007/0050609 A1 | 3/2007 | Ferren et al. |
| 2007/0202473 A1 | 8/2007 | Koda |
| 2007/0226186 A1 | 9/2007 | Ewen et al. |
| 2008/0005476 A1 | 1/2008 | Venkatesan |
| 2008/0034179 A1 | 2/2008 | Mewhinney et al. |
| 2008/0109592 A1 | 5/2008 | Karamcheti et al. |
| 2008/0140682 A1 | 6/2008 | Grosset et al. |
| 2008/0288718 A1 | 11/2008 | Hepkin et al. |
| 2008/0288742 A1 | 11/2008 | Hepkin et al. |
| 2009/0049234 A1 | 2/2009 | Oh et al. |
| 2009/0157952 A1 | 6/2009 | Kim et al. |
| 2009/0157964 A1 | 6/2009 | Kasorla |
| 2009/0182976 A1 | 7/2009 | Agesen et al. |
| 2009/0307462 A1* | 12/2009 | Fleming .............. G06F 12/126 711/206 |
| 2010/0010799 A1 | 1/2010 | Altrichter |
| 2010/0042999 A1 | 2/2010 | Dorai et al. |
| 2010/0153631 A1 | 6/2010 | Moon et al. |
| 2010/0169602 A1* | 7/2010 | Hulbert .............. G06F 12/0246 711/165 |
| 2010/0262633 A1 | 10/2010 | Bhattacharjee et al. |
| 2010/0287356 A1 | 11/2010 | Cameron et al. |
| 2010/0306591 A1 | 12/2010 | Krishna |
| 2010/0318718 A1 | 12/2010 | Eilert et al. |
| 2011/0066808 A1 | 3/2011 | Flynn et al. |
| 2011/0072006 A1 | 3/2011 | Yu et al. |
| 2011/0078340 A1 | 3/2011 | Kim et al. |
| 2011/0093654 A1 | 4/2011 | Roberts et al. |
| 2011/0131199 A1 | 6/2011 | Simon et al. |
| 2011/0271264 A1 | 11/2011 | Vorbach et al. |
| 2011/0313999 A1 | 12/2011 | Bruno et al. |
| 2012/0072744 A1 | 3/2012 | Jain et al. |
| 2012/0089595 A1 | 4/2012 | Jaecksch |
| 2012/0124318 A1 | 5/2012 | Bivens |
| 2012/0144092 A1 | 6/2012 | Hsieh |
| 2012/0151127 A1 | 6/2012 | Lim |
| 2012/0151252 A1 | 6/2012 | Harris et al. |
| 2012/0158799 A1 | 6/2012 | Morsi et al. |
| 2012/0246392 A1 | 9/2012 | Cheon |
| 2012/0290768 A1 | 11/2012 | Rubowitz et al. |
| 2013/0013860 A1 | 1/2013 | Franceschini |
| 2013/0074092 A1 | 3/2013 | Gounares et al. |
| 2013/0080621 A1 | 3/2013 | Jain et al. |
| 2013/0081005 A1 | 3/2013 | Gounares et al. |
| 2013/0086309 A1 | 4/2013 | Lee |
| 2013/0103380 A1 | 4/2013 | Brandstatter et al. |
| 2013/0226903 A1 | 8/2013 | Wu et al. |
| 2013/0246698 A1 | 9/2013 | Estan |
| 2013/0275716 A1 | 10/2013 | Nishida |
| 2013/0283250 A1 | 10/2013 | Eichenberger |
| 2013/0326109 A1* | 12/2013 | Kivity .................. G06F 9/5016 711/6 |
| 2014/0007043 A1 | 1/2014 | Aliseychik et al. |
| 2014/0089564 A1 | 3/2014 | Liu et al. |
| 2014/0108723 A1 | 4/2014 | Nowoczynski |
| 2014/0188870 A1 | 7/2014 | Borthakur |
| 2014/0280685 A1 | 9/2014 | Magenheimer |
| 2014/0281212 A1 | 9/2014 | Schreter et al. |
| 2014/0281249 A1 | 9/2014 | Waldsperger |
| 2014/0282455 A1 | 9/2014 | Felch |
| 2014/0293801 A1 | 10/2014 | Dimou |
| 2015/0012465 A1 | 1/2015 | Pingenot |
| 2015/0062736 A1 | 3/2015 | Kim et al. |
| 2015/0077426 A1 | 3/2015 | Kweon et al. |
| 2015/0081300 A1 | 3/2015 | Kim |
| 2015/0089604 A1 | 3/2015 | Mathew |
| 2015/0106582 A1 | 4/2015 | Mai et al. |
| 2015/0169226 A1 | 6/2015 | Shen et al. |
| 2015/0199126 A1 | 7/2015 | Jayasena |
| 2015/0206574 A1 | 7/2015 | Greathouse |
| 2015/0309789 A1 | 10/2015 | Thorat |
| 2015/0363319 A1 | 12/2015 | Qi |
| 2015/0370560 A1 | 12/2015 | Tan |
| 2015/0378169 A1 | 12/2015 | Naeimi |
| 2016/0019132 A1 | 1/2016 | Vilakkunnadathil |
| 2016/0117258 A1 | 4/2016 | Karamcheti et al. |
| 2016/0125927 A1 | 5/2016 | Wei |
| 2016/0150003 A1 | 5/2016 | Magdon-Ismall |
| 2016/0179685 A1 | 6/2016 | Byun et al. |
| 2016/0188217 A1 | 6/2016 | Golander et al. |
| 2016/0196112 A1 | 7/2016 | Edwards et al. |
| 2016/0196324 A1 | 7/2016 | Haviv et al. |
| 2016/0005423 A1 | 8/2016 | Neppalli et al. |
| 2016/0253093 A1 | 9/2016 | Zhang |
| 2016/0321048 A1 | 11/2016 | Matsuura |
| 2016/0328169 A1 | 11/2016 | Hassan |
| 2016/0336069 A1 | 11/2016 | Lin |
| 2016/0378169 A1 | 12/2016 | Naeimi |
| 2016/0378829 A1 | 12/2016 | Vengerov et al. |
| 2016/0378977 A1 | 12/2016 | Alme et al. |
| 2017/0010817 A1 | 1/2017 | Lim |
| 2017/0052741 A1 | 2/2017 | Hassan |
| 2017/0052742 A1 | 2/2017 | Hassan |
| 2017/0060740 A1 | 3/2017 | Doerner |
| 2017/0090776 A1 | 3/2017 | Kowles |
| 2017/0091334 A1 | 3/2017 | Kabiljo et al. |
| 2017/0115892 A1 | 4/2017 | Gokita |
| 2017/0116210 A1 | 4/2017 | Park et al. |
| 2017/0147516 A1 | 5/2017 | De |
| 2017/0154136 A1 | 6/2017 | Eckmann et al. |
| 2017/0160955 A1 | 6/2017 | Jayasena |
| 2017/0161198 A1 | 6/2017 | Trika |
| 2017/0193136 A1 | 7/2017 | Prasad et al. |
| 2017/0206010 A1 | 7/2017 | Nachimuthu |
| 2017/0206172 A1 | 7/2017 | Ma |
| 2017/0212843 A1 | 7/2017 | Agesen et al. |
| 2017/0220256 A1 | 8/2017 | Balasubramonian |
| 2017/0220257 A1 | 8/2017 | Balasubramonian |
| 2017/0220488 A1 | 8/2017 | Balasubramonian |
| 2017/0220516 A1 | 8/2017 | Eilert et al. |
| 2017/0223046 A1 | 8/2017 | Singh |
| 2017/0242595 A1 | 8/2017 | Niu |
| 2017/0289000 A1 | 10/2017 | Parks et al. |
| 2017/0301386 A1 | 10/2017 | Parks et al. |
| 2017/0352012 A1 | 12/2017 | Hearn et al. |
| 2018/0024754 A1 | 1/2018 | Hassan |
| 2018/0024755 A1 | 1/2018 | Hassan |
| 2018/0024821 A1 | 1/2018 | Hassan |
| 2018/0024913 A1 | 1/2018 | Hassan |
| 2018/0024922 A1 | 1/2018 | Hassan |
| 2018/0024923 A1 | 1/2018 | Hassan |
| 2018/0024928 A1 | 1/2018 | Hassan |
| 2018/0024997 A1 | 1/2018 | Hassan |
| 2018/0025016 A1 | 1/2018 | Hassan |
| 2018/0025055 A1 | 1/2018 | Hassan |

(56) References Cited

U.S. PATENT DOCUMENTS

2018/0025904 A1 1/2018 Hassan
2019/0057131 A1 2/2019 Hassan

OTHER PUBLICATIONS

U.S. Appl. No. 14/704,461, Ahmad Hassan, filed May 5, 2015.
U.S. Appl. No. 14/831,567, Ahmad Hassan, filed Aug. 20, 2015.
U.S. Appl. No. 14/831,624, Ahmad Hassan, filed Aug. 20, 2015.
U.S. Appl. No. 15/213,626, filed Jul. 19, 2016, Ahmad Hassan.
U.S. Appl. No. 15/213,654, filed Jul. 19, 2016, Ahmad Hassan.
U.S. Appl. No. 15/213,674, filed Jul. 19, 2016, Ahmad Hassan.
U.S. Appl. No. 15/213,754, filed Jul. 19, 2016, Ahmad Hassan.
U.S. Appl. No. 15/213,816, filed Jul. 19, 2016, Ahmad Hassan.
U.S. Appl. No. 15/213,861, filed Jul. 19, 2016, Ahmad Hassan.
U.S. Appl. No. 15/213,930, filed Jul. 19, 2016, Ahmad Hassan.
U.S. Appl. No. 15/213,960, filed Jul. 19, 2016, Ahmad Hassan.
U.S. Appl. No. 15/214,019, filed Jul. 19, 2016, Ahmad Hassan.
U.S. Appl. No. 15/214,082, filed Jul. 19, 2016, Ahmad Hassan.
U.S. Appl. No. 15/214,102, filed Jul. 19, 2016, Ahmad Hassan.
U.S. Appl. No. 15/677,700, filed Aug. 15, 2017, Ahmad Hassan.
Dhiman et al., "PDRAM: A hybrid PRAM and DRAM main memory system," Proceedings of the 46th Annual Design Automation Conference, Jul. 26-31, 2009, pp. 664-669.
Hassan et al., "Energy-Efficient In-Memory Data Stores on Hybrid Memory Hierarchies," Eleventh International Workshop on Dada Management on New Hardware, Jun. 2015, last retrieved from https://event.cwi.nl/damon2015/slides/slides-hassan.pdf on Jan. 5, 2018.
Hassan et al., "Analytical models and techniques for Software-Managed Energy-Efficient Hybrid DRAM/NVM Main Memory," AMC International Conference on Computing Frontiers 2015, May 18-21, 2015.
Hu et al., "Data allocation optimization for hybrid scratch pad memory with sram and nonvolatile memory," IEEE Transactions on Very Large Scale Integration (VLSI) Systems, Jun. 2013, 21(6): 1094-1102.
Li et al., "Assert(!Defined(Sequential I/O))," Proceedings of the 6th USENIX Conference on Hot Topics in Storage and File Systems, Jun. 17-18, 2014, 1-5.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
Wang et al., "Optimizated Allocation of Data Variables to PCM/DRAM-based Hybrid Main Memory for Real-Time Embedded Systems," Embedded Systems Letters, IEEE, Sep. 2014, 6(3):61-64.
USPTO Office Action in related U.S. Appl. No. 15/213,654 dated Dec. 1, 2017; 21 pages.
USPTO Office Action in related U.S. Appl. No. 15/213,654 dated Mar. 16, 2018; 31 pages.
USPTO Office Action in related U.S. Appl. No. 15/214,019 dated Dec. 22, 2017; 12 pages.
USPTO Office Action in related U.S. Appl. No. 15/213,960 dated Jan. 11, 2018; 22 pages.
Office Action in U.S. Appl. No. 15/213,930 dated Feb. 26, 2019, 35 pages.
Final Office Action issued in U.S. Appl. No. 15/214,082 dated Mar. 8, 2019, 41 pages.
U.S. Office Action in related U.S. Appl. No. 15/213,654 dated Jul. 2, 2018, 41 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jan. 29, 2019, 29 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Feb. 7, 2019, 27 pages.
U.S. Office Action in related U.S. Appl. No. 15/213,816 dated Jul. 26, 2018, 27 pages.
U.S. Office Action in related U.S. Appl. No. 15/213,930 dated Jun. 19, 2018, 20 pages.
U.S. Office Action in related U.S. Appl. No. 15/213,930 dated Mar. 9, 2018, 20 pages.
U.S. Office Action in related U.S. Appl. No. 15/213,930 dated Oct. 20, 2018, 23 pages.
U.S. Office Action in related U.S. Appl. No. 15/213,960 dated Dec. 13, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Feb. 6, 2019, 34 pages.
U.S. Office Action in related U.S. Appl. No. 15/214,102 dated Jul. 24, 2018, 33 pages.
U.S. Office Action in related U.S. Appl. No. 15/213,626 dated Apr. 12, 2019, 23 pages.
U.S. Office Action in related U.S. Appl. No. 15/213,674 dated Apr. 12, 2019, 27 pages.
Chen et al., ""FSRAM: Flexible Sequential and Random AccessMemory for Embedded Systems"" Laboratory for Advanced Research in Computing Technology and Compilers Technical Report No. ARCTiC, Mar. 1, 2004, 6 pages.
Dulloor et al., ""Data tiering in heterogeneous memory systems"" Proceedings of the Eleventh European Conference on Computer Systems, ACM, Apr. 18, 2016, 16 pages.
Ouyang et al., ""SSD-Assisted Hybrid Memory to Accelerate Menncached over High Performance Networks"" 2012 41stInternational Conference on Parallel Processing, IEEE, Sep. 10, 2012, 10 pages.
U.S. Office Action in related U.S. Appl. No. 15/213,754 dated May 23, 2019, 32 pages.
U.S. Office Action in related U.S. Appl. No. 15/213,816 dated Jun. 18, 2019, 46 pages.
Wang et al., ""NVMalloc: Exposing an Aggregate SSD Store as a Memory Partition in Extreme-Scale Machines"" 2012 IEEE 26th International Parallel and Distributed Processing Symposium, May 21, 2012, 12 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.

* cited by examiner

WORKLOAD-AWARE PAGE MANAGEMENT FOR IN-MEMORY DATABASES IN HYBRID MAIN MEMORY SYSTEMS

BACKGROUND

Enterprises, such as business enterprises, operate enterprise systems to provide software functionality to customers and employees. In some examples, an enterprise system can include back-end enterprise servers that host enterprise applications. Example enterprise applications include enterprise resource planning (ERP) systems, client-relationship management (CRM) systems, product lifecycle management (PLM) systems, supply chain management (SCM) systems, and supplier relationship management (SRM) systems. During operation of an enterprise application, application data is accessed, which is stored in main memory of the enterprise server. In this manner, the application data is immediately accessible by processors of the enterprise server.

Increasingly large amounts of application data are stored in the main memory (in-memory) of enterprise servers. In-memory computing has enabled the advance of enterprise applications including real-time functionality over enormous data sets. Main memory can include dynamic random access memory (DRAM), which consumes a relatively high amount of static energy (both in active and idle states) due to continuous leakage and refresh power. Various byte-addressable non-volatile memory (NVM) technologies (e.g., memristors) promise near-zero static energy and persistence. However, such NVM can suffer from increased latency and increased dynamic energy.

SUMMARY

Implementations of the present disclosure include computer-implemented methods for workload-aware page management in hybrid main memory systems. In some implementations, methods include actions of receiving a sorted list of pages, each page corresponding to a fixed-length contiguous block of virtual memory, and being associated with a respective state, each state indicating a number of off-chip accesses determined for a respective page, and executing an application, which queries an in-memory database provided with a hybrid memory system, and, during execution of the application: identifying at least one page in the sorted list of pages as a page that is to-be-locked during execution of the application based on a threshold, and locking the at least one page in main memory to inhibit swapping of the at least one page by an operating system.

These and other implementations can each optionally include one or more of the following features: the hybrid main memory system includes at least dynamic random access memory (DRAM) and non-volatile memory (NVM); the at least one page is stored in DRAM; one or more pages in the sorted list of pages are unlocked during execution of the application, and are stored in NVM; each state is determined as a sum of a number of off-chip writes and off-chip reads for the respective page; actions further include: receiving source code of the application, providing an instrumented application that includes the source code and instrumentation code, the instrumented application including at least one instruction for profiling a plurality of pages, executing the instrumented application to process a set of benchmark queries to provide a statistics file, the statistics file indicating, for each page in the plurality of pages, the respective state, storing page and state tuples in a list of pages, and sorting the list of pages based on state values to provide the sorted list of pages; and sorting includes ranking pages in the list of pages based on the state values.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to managing hybrid main memory including dynamic random access memory (DRAM) and non-volatile memory (NVM). More particularly, implementations of the present disclosure are directed to workload-aware page management in hybrid main memory systems. In some implementations, and as described in further detail herein, actions can include receiving a sorted list of pages, each page corresponding to a fixed-length contiguous block of virtual memory, and being associated with a respective state, each state indicating a number of off-chip accesses determined for a respective page, and executing an application, which queries an in-memory database provided with a hybrid memory system, and, during execution of the application: identifying at least one page in the sorted list of pages as a page that is to-be-locked during execution of the application based on a threshold, and locking the at least one page in main memory to inhibit swapping of the at least one page by an operating system.

DRAM scaling has been used to address management of application data in main memory of enterprise servers. As there are limits to DRAM scaling, byte-addressable NVM is considered for use in main memory replacement. NVM, however, has certain disadvantages, which can vary between NVM technologies. Generally, disadvantages of NVM include increased latency and dynamic energy for NVM accesses, and reduced memory bandwidth and a fast wear-out of NVM devices as compared to DRAM. NVM, however, also has advantages. For example, NVM will scale to smaller feature sizes and has a significantly decreased lower static energy due to the absence of refresh operations (e.g., approximately 100× lower as compared to DRAM).

Hybrid main memory, including both DRAM and NVM, is implemented to address the disadvantages of NVM. The concept behind hybrid main memory is that a small amount of DRAM holds frequently accessed data (hot data) and provides low latency and low dynamic energy, while a large amount of NVM is used to implement a scalable memory system and store the majority of less frequently accessed data (cold data).

In-memory computing has significantly influenced the design of enterprise applications in terms of functionality, real-time process management, and real-time decision making. In some examples, in-memory computing platforms enable real-time analysis of large volumes of data, planning, and forecasting, among other features. In some examples, real-time data analytics attempt to make knowledge available with sub-second (and even sub-millisecond) response time. For example, real-time enterprise resource planning (ERP) enables enterprises to view every change in the enterprise as soon as it occurs, and has become a key attribute in the success of the enterprise. In the business context, real-time access to business information helps gain competitive advantage through efficient and improved decision making, product pricing, risk management, product lifecycle, customer feedback, customer engagement, brand development, product pricing, and reduced total cost of ownership (TCO).

Figure 1:
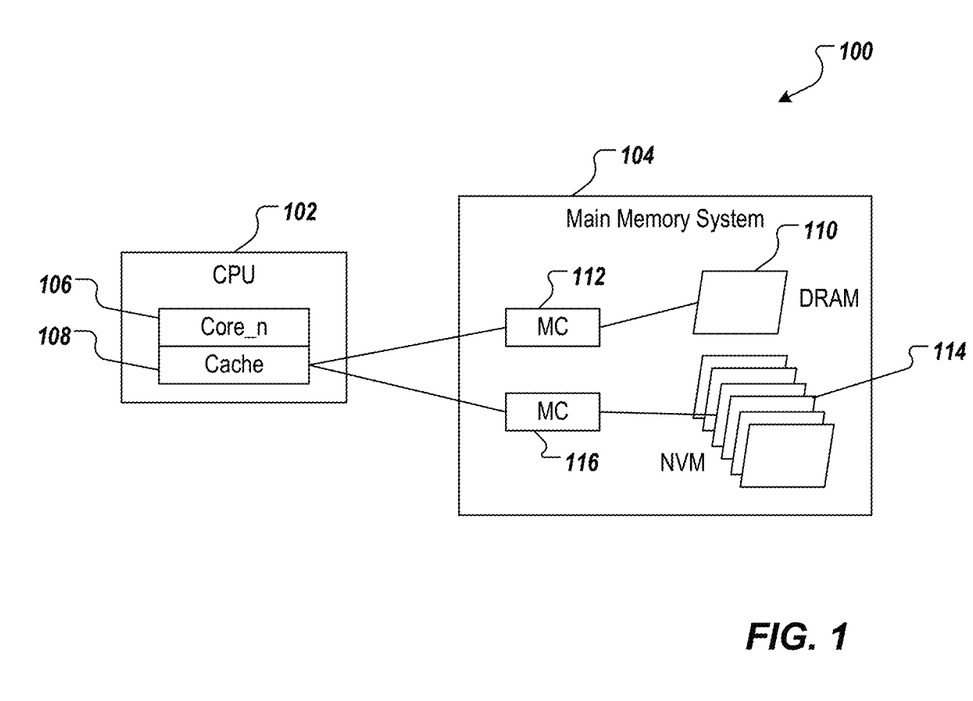
FIG. 1 depicts an example memory architecture in accordance with implementations of the present disclosure.

FIG. 1 depicts an example memory architecture 100 that can be implemented within an enterprise server, for example. In the example of FIG. 1, the example memory architecture 100 includes a central processing unit (CPU) 102 and a main memory system 104. The CPU 102 includes a core 106 having a respective cache 108. Although a single core and respective cache 108 is depicted, it is appreciated that the CPU 102 can include multiple cores, each with a respective cache. Further, although a single CPU 102 is depicted, it is appreciated that enterprise servers can include multiple CPUs. The main memory system 104 includes DRAM 110 with a respective memory controller (MC) 112, and NVM 114 with a respective MC 116. In some examples, the cache 108 accesses (e.g., read, write, delete) the DRAM 110 through the MC 112, and accesses (e.g., read, write, delete) the NVM 114 through the MC 114.

In some examples, the example memory architecture 100 can be implemented in an in-memory database system. In some examples, an in-memory database system is a database management system that uses main memory for data storage. In some examples, main memory includes random access memory (RAM) that communicates with one or more processors, e.g., central processing units (CPUs), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

In-memory computing platforms are executed in main memory, as opposed to disk-based memory. However, when the platform runs out of main memory, the operating system swaps out pages to disk-based memory to make space for new pages in the main memory. In some examples, a page (also referred to as a memory page, or virtual page), is a fixed-length contiguous block of virtual memory, which can be described by a single entry in a page table. In some examples, a page is the smallest unit of data for memory management in a virtual memory operating system (OS). Determining which pages are to be swapped out affects the throughput of the underlying database(s). For example, if so-called hot pages (e.g., pages storing hot data) are swapped out, the OS would need to bring them back in upon the next page fault. This is a time consuming process.

Page management (also referred to as paging) is an important feature in the OS, and is the process through which virtual memory is managed. At the OS level, the virtual memory is allocated as multiples of pages. In some examples, a typical size of a page is 4096 bytes (e.g., in Linux). When a user library malloc or mmap requests a virtual memory segment from the OS, the OS calculates the number of pages it would require to serve that memory request. The OS allocates those pages and returns the address of the first page back to the application. The page addresses are part of virtual address space that is backed by the physical memory. In a hierarchical memory system, main memory and storage memory are provided. If there are more pages that need to be allocated than the available physical main memory, then the process of page swapping is executed by the OS. The page swapping process swaps some pages out to the storage layer in order to make room for new pages to be allocated or reloaded from the previously swapped out pages. Which pages the OS swaps out influences the required quality of service (QOS). For example, if the wrong pages are swapped out, the OS would require lot of time to bring those pages back into the main memory, if they are frequently accessed during the remainder of a query execution plan (QEP).

Implementations of the present disclosure are directed to identifying one or more pages as critical pages, and locking the critical pages in main memory to inhibit the OS from swapping one or more of the critical pages from main memory. Implementations also provide a tool for capturing the paging behavior of a given workload to identify critical pages. Implementations of the present disclosure also discuss faster NVM memory for swapping storage technology where shadow copies of pages can be stored. In some examples, and as described in further detail herein, only the dirty pages are overwritten in the NVM, and, if the content of the pages are same then nothing is done. This provides a significant reduction in write traffic going toward the NVM.

Figure 2:
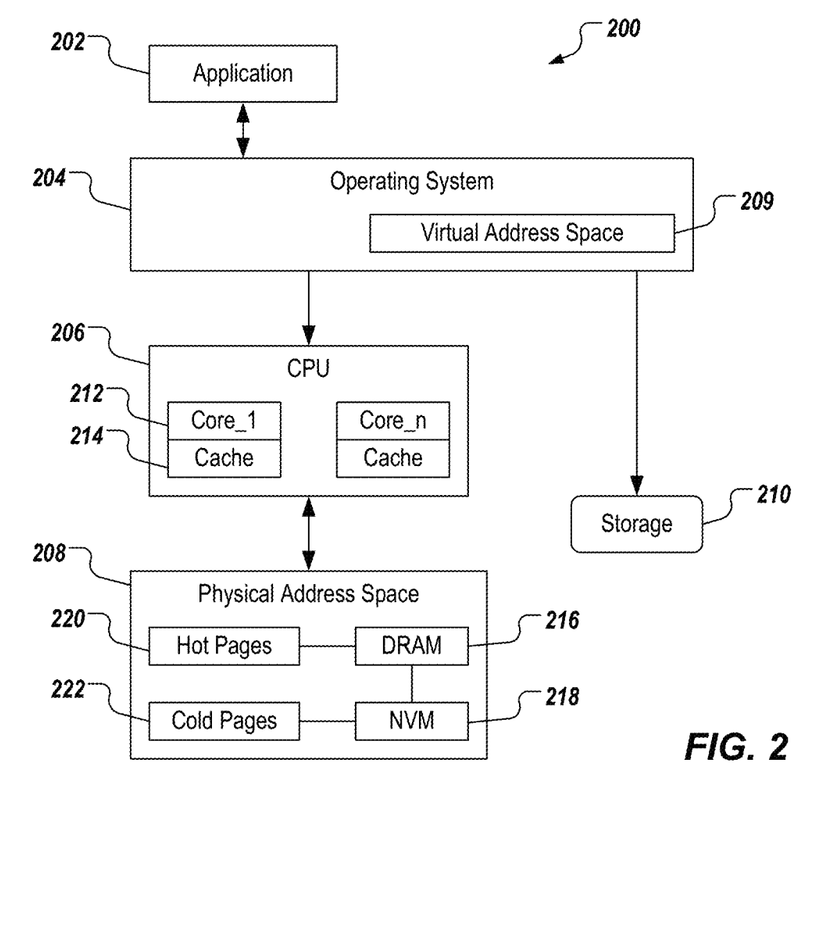
FIG. 2 depicts an example architecture for workload-based page management in accordance with implementations of the present disclosure.

FIG. 2 depicts an example architecture 200 for workload-based page management in accordance with implementations of the present disclosure. In the depicted example, the example architecture 200 includes an application 202, an OS 204, a CPU 206, a physical address space 208, a virtual address space 209, and storage 210. In some examples, execution of the application 202 is coordinated by the OS 204. The CPU 206 includes a plurality of cores 212 (Core_1, . . . , Core_n) with respective caches 214 (e.g., last-level cache (LLC)). In some examples, the CPU 206 coordinates read/write access to the physical address space 208, which is provided as a hybrid main memory (e.g., the main memory system 104 of FIG. 1), described herein. Accordingly, the physical address space 208 includes DRAM 216 and NVM 218 for storing hot pages 220 and cold pages 222, respectively. In some examples, the application 202 is the application, for which data allocations between the DRAM 216 and NVM 218 are to be made. That is, the application 202 is the application that is profiled to identify hot pages and cold pages, and to lock hot pages (critical pages) in main memory, as described in further detail herein. In some examples, the virtual address space 209 is provided as a set of binary addresses that is used by the operating system 204 to allocate memory addresses to any process requesting the memory. In some examples, the virtual address space 209 enables the processes to use more memory addresses than the actual DRAM memory available in the system. In some implementations, the operating system 204 manages the mappings between virtual addresses and physical addresses. In some examples, the storage 210 is provided as hard disk drive that is used for permanent storage of data.

As introduced above, implementations of the present disclosure are directed to identifying hot pages and cold pages for an application execution, and locking the hot pages (critical pages) in main memory to inhibit swapping of hot pages from main memory. In some implementations, a profiling tool is provided, which is used to instrument an application to provide an instrumented application. The instrumented application is executed to determine, for each page, statistics including main memory reads and main memory writes. In some examples, a set of benchmark queries are executed using the instrumented application to provide the statistics at the page granularity for each benchmark query, individually. Example benchmark queries can include queries provided in the TPC Benchmark H (TPC-H) provided by the Transaction Processing Performance Council of San Francisco, Calif. The TPC-H is a decision support benchmark that includes a set of business oriented ad-hoc queries (e.g., a set of benchmark queries), and concurrent data modifications. The TPC-H is described as being representative of decision support systems that examine large volumes of data, execute queries with a high degree of complexity, and provide answers to critical business questions.

In some implementations, the statistics are processed based on a metric to classify each page of the workload as either a hot page or a cold page. During subsequent executions of the application, the mlock and munlock memory management interfaces of the OS are used to lock hot pages in main memory. In some examples, the mlock and munlock memory management interfaces are respectively provided as:

int mlock (const void *addr, size_t len)
int munlock (const void *addr, size_t len)

where the first argument is the starting virtual address of a page and the second argument is the page size (e.g., 4096 bytes).

Figure 3:
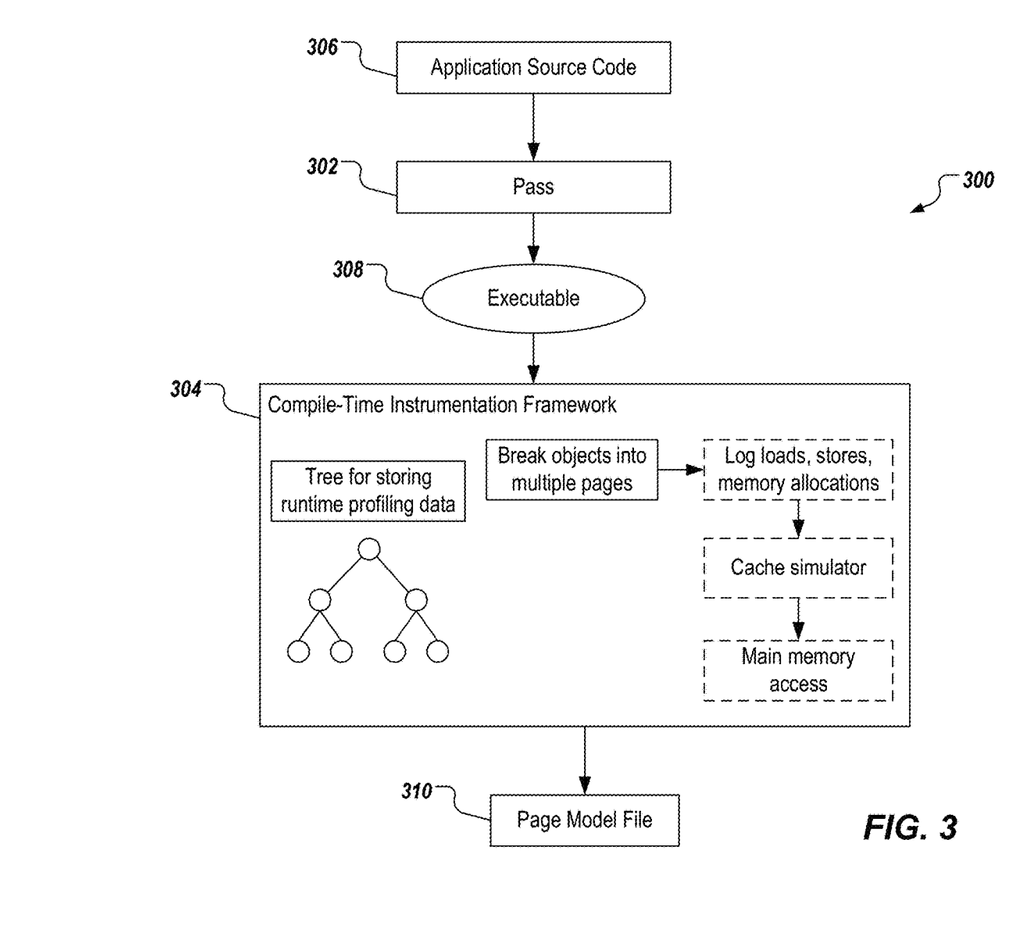
FIG. 3 depicts an example architecture to provide page profiling in accordance with implementations of the present disclosure.

FIG. 3 depicts an example architecture 300 to provide page profiling in accordance with implementations of the present disclosure. In the depicted example, the example architecture 300 includes a pass 302 (e.g., an LLVM pass), and a compile-time instrumentation framework 304. In some examples, the pass 302 receives application source code 306 (e.g., source code of the application that is to be profiled), and provides executable code 308. In some examples, the pass 302 compiles the source code and adds instrumentation code to provide the executable code 308. In some examples, the instrumentation code includes instructions to profile the application during execution (e.g., objects, sizes, loads/stores of allocations).

In some implementations, the profiling tool uses the compiler framework (e.g., LLVM) to add the instrumentation code to the application. To achieve this, an instrumentation tool is used as the pass in a compiler (e.g., LLVM compiler). In some examples, the instrumentation tool takes source code as an input, analyzes the source code, and provides executable bit-code (e.g., human-readable code) with added instrumentation code (as described above with reference to FIG. 3). In some examples, instrumentation code is added to call a method in the memory profiling library (MPL) to register every allocated variable. For the registration of global variables, MPL calls are added at the beginning of main method. Calls into the MPL are added next to each load and store instruction in the IR to record the memory access.

In some implementations, calls to MPL runtime library include the declaration of statically allocated objects, the (de-)allocation of dynamically allocated stack and heap objects, and the interception of load and store assembly operations. In some implementations, load and store operations are run through a simulator of the on-chip memory hierarchy in order to derive the frequency of cache misses and write-back events occurring for each object.

In some implementations, system libraries are not instrumented. Consequently, calls to common system functions are intercepted at instrumentation time, and the memory accesses performed by these functions are simulated using memory hierarchy simulator. Example intercepted functions include string and memory copy and compare functions (e.g., strcpy) and file I/O (e.g., read). For some functions the (de-) allocation of objects is emulated as a side-effect (e.g., fopen and (close).

In some examples, the executable code 308 is provided as bit-code (e.g., machine-readable) and is executed by the compile-time instrumentation framework 304 to provide a statistics file 310, as described in further detail herein. In some examples, the statistics file 310 provides an inventory of all page allocations implicated by the application processing the set of benchmark queries, and, for each page, the number of main memory reads and the number of main memory writes.

In accordance with implementations of the present disclosure, the statistics file is processed to classify pages as either hot pages, or cold pages. In some examples, hot pages are also referred to as critical pages. In some implementations, the statistics profile includes pages 1, . . . n (e.g., $P_1, \ldots, P_n$), and for each page in the statistics profile, a respective state S is determined (e.g., $S_1, \ldots, S_n$). In some examples, S is determined as the sum of the number of off-chip reads and off-chip writes for a respective page. The term off-chip indicates accesses (reads/writes) going to main memory. In some implementations, a list is provided and includes tuples of pages and respective states (e.g., $L \rightarrow [\{P_1, S_1\}, \ldots \{P_n, S_n\}]$). In some implementations, the list is sorted to provide a sorted list. In some examples, the list is sorted, such that pages having the highest number of off-chip accesses (e.g., highest S value) are at the top of the list, while pages having the lowest number of off-chip accesses (e.g., lowest S value) are at the bottom of the list. In other words, the pages are put in rank order from highest to lowest based on respective state values.

In some implementations, a threshold λ is provided, and is used to classify pages as either hot pages or cold pages. In some examples, state values that are below the threshold λ are considered critical pages, and are locked in main memory. For example, if $S_i>\lambda$, then mlock (vaddr, 4096), else nothing; where i=1, . . . n, vaddr is the virtual address of the beginning of page $P_1$, and 4096 is the size of $P_1$ in bytes.

In some implementations, and as noted above, NVM is used as storage (e.g., rather than disk-based memory) to provide faster access time, and to exploit the persistence of NVM. In some examples, upon page allocation/initialization, a shadow copy of each page is stored in NVM (e.g., NVM is relatively cheap, and has relatively higher density). In some examples, if the OS intends to swap out an unlocked page, it is first determined whether the page is a dirty page. In some examples, a dirty page refers to a page having data that has been overwritten or updated since it was last read from the main memory. If the page is a dirty page, the version of the page stored in the NVM is replaced with the unlocked page that the OS is swapping out.

In accordance with implementations of the present disclosure, any page having an S that is greater than λ is a hot page that is to-be-locked during execution of the application, and that is stored in DRAM. Accordingly, hot pages are identified, stored in DRAM, and locked in DRAM.

Figure 4:
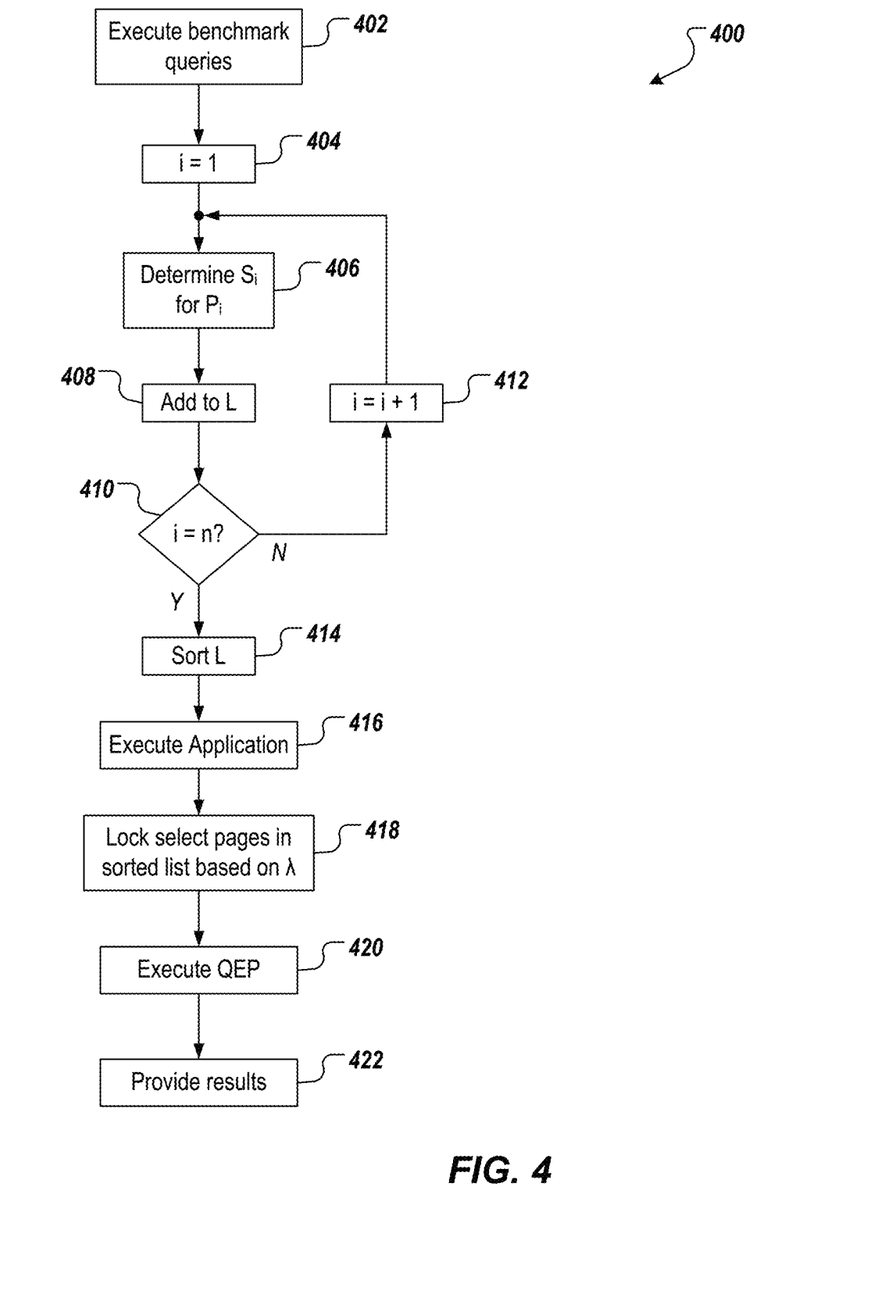
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs executed using one or more computing devices.

A set of benchmark queries are executed to provide a statistics file (402). For example, an instrumented application is used to execute the set of benchmark queries (e.g., TPC-H), and a statistics file is provided (as described above with reference to FIG. 3). In some examples, the statistics file provides statistics for a plurality of pages $P_1$, . . . , $P_n$ implicated in execution of the set of benchmark queries. In some examples, the statistics file provides, for each page, a number of main memory reads and a number of main memory writes. A counter i is set equal to 1 (404). A state $S_1$ is determined for a page $P_i$ (406). For example, and as described above, the state is determined as the sum of the number of off-chip reads and off-chip writes for the page. A page and state tuple ($\{P_i, S_i\}$) is added to a list L. It is determined whether i is equal to n (410). In other words, it is determined whether all pages in the set of profile pages (e.g., $P_1$, . . . , $P_n$) have had respective states determined, and have been added to the list L. If i is not equal to n, i is incremented (412), and the process 400 loops back to process the next page.

If i is equal to n, the list is sorted to provide a sorted list (414). In some examples, and as described above, the list is sorted such that pages having the highest number of off-chip accesses (e.g., highest S value) are at the top of the list, while pages having the lowest number of off-chip accesses (e.g., lowest S value) are at the bottom of the list. In other words, the pages are put in rank order from highest to lowest based on respective state values.

The application is executed (416). For example, the application, which had been instrumented to provide the instrumented application used to provide the statistics file, is used in production, for example, to run one or more queries over data stored in an in-memory database. One or more pages in the sorted list are locked in main memory based on the threshold λ. In some examples, and as described above, state values that are below the threshold λ are considered critical pages, and their respective pages are locked in main memory. For example, if $S_i>\lambda$, then mlock (vaddr, 4096), else nothing. A query is submitted through the application and a respective QEP is executed (420), and a response is provided (422). For example, a user submits a query to the in-memory database through the application, a respective QEP is provided to execute the query, and the QEP is performed based on the locked pages to provide a response to the query. The response is provided to the user that submitted the query.

Figure 5:
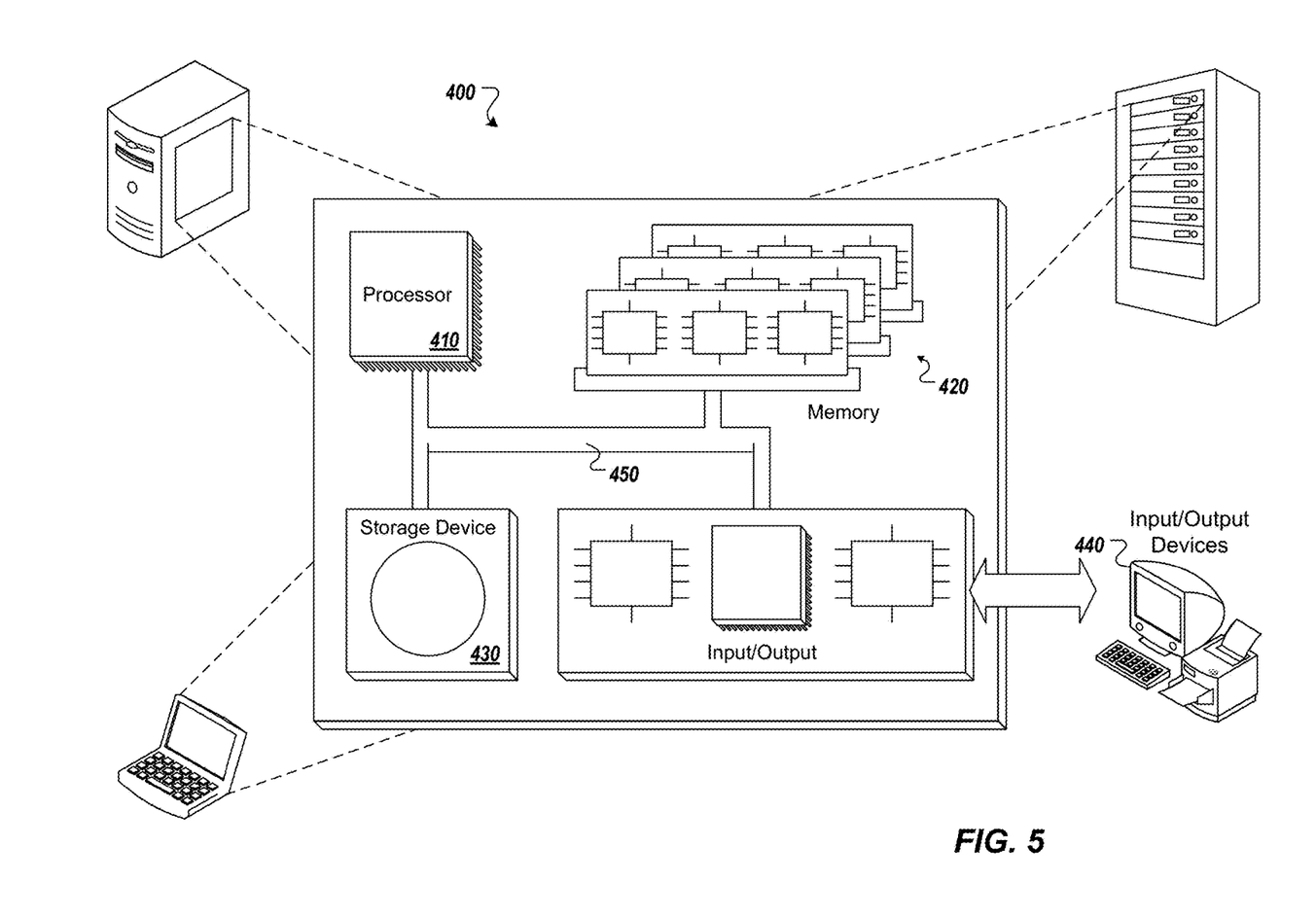
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
   prior to executing an application that queries an in-memory database provided with a hybrid memory system, receiving a sorted list of pages, each page corresponding to a fixed-length contiguous block of virtual memory, and being associated with a respective state, each state indicating a number of off-chip accesses determined for a respective page, each state being determined based on a query execution plan (QEP) that is executed within the hybrid memory system in response to a query submitted by the application; and
   executing the application, and, during execution of the application:
      determining the QEP responsive to the query submitted by the application,
      identifying at least one page in the sorted list of pages as a page that is to-be-locked based on comparing the state of the at least one page to a threshold,
      locking the at least one page in main memory to inhibit swapping of the at least one page from main memory by an operating system, and
      executing the QEP to access the at least one page in the main memory to provide a result.

2. The method of claim 1, wherein the hybrid main memory system comprises at least dynamic random access memory (DRAM) and non-volatile memory (NVM).

3. The method of claim 2, wherein the at least one page is stored in DRAM.

4. The method of claim 2, wherein one or more pages in the sorted list of pages are unlocked during execution of the application, and are stored in NVM.

5. The method of claim 1, wherein each state is determined as a sum of a number of off-chip writes and off-chip reads for the respective page.

6. The method of claim 1, further comprising:
   receiving source code of the application;
   providing an instrumented application that includes the source code and instrumentation code, the instrumented application comprising at least one instruction for profiling a plurality of pages;
   executing the instrumented application to process a set of benchmark queries to provide a statistics file, the statistics file indicating, for each page in the plurality of pages, the respective state;
   storing page and state tuples in a list of pages; and
   sorting the list of pages based on state values to provide the sorted list of pages.

7. The method of claim 1, wherein sorting comprises ranking pages in the list of pages based on the state values.

8. A non-transitory computer-readable storage medium coupled to one or more processors and having instructions stored thereon which, when executed by the one or more processors, cause the one or more processors to perform operations comprising:
   prior to executing an application that queries an in-memory database provided with a hybrid memory system, receiving a sorted list of pages, each page corresponding to a fixed-length contiguous block of virtual memory, and being associated with a respective state, each state indicating a number of off-chip accesses determined for a respective page, each state being determined based on a query execution plan (QEP) that is executed within the hybrid memory system in response to a query submitted by the application; and executing the application, and, during execution of the application:
- determining the QEP responsive to the query submitted by the application,
- identifying at least one page in the sorted list of pages as a page that is to-be-locked based on comparing the state of the at least one page to a threshold,
- locking the at least one page in main memory to inhibit swapping of the at least one page from main memory by an operating system, and
- executing the QEP to access the at least one page in the main memory to provide a result.

9. The computer-readable storage medium of claim 8, wherein the hybrid main memory system comprises at least dynamic random access memory (DRAM) and non-volatile memory (NVM).

10. The computer-readable storage medium of claim 9, wherein the at least one page is stored in DRAM.

11. The computer-readable storage medium of claim 9, wherein one or more pages in the sorted list of pages are unlocked during execution of the application, and are stored in NVM.

12. The computer-readable storage medium of claim 8, wherein each state is determined as a sum of a number of off-chip writes and off-chip reads for the respective page.

13. The computer-readable storage medium of claim 8, wherein operations further comprise:
- receiving source code of the application;
- providing an instrumented application that includes the source code and instrumentation code, the instrumented application comprising at least one instruction for profiling a plurality of pages;
- executing the instrumented application to process a set of benchmark queries to provide a statistics file, the statistics file indicating, for each page in the plurality of pages, the respective state;
- storing page and state tuples in a list of pages; and
- sorting the list of pages based on state values to provide the sorted list of pages.

14. The computer-readable storage medium of claim 8, wherein sorting comprises ranking pages in the list of pages based on the state values.

15. A system, comprising:
- a computing device; and
- a computer-readable storage device coupled to the computing device and having instructions stored thereon which, when executed by the computing device, cause the computing device to perform operations comprising:
  - prior to executing an application that queries an in-memory database provided with a hybrid memory system, receiving a sorted list of pages, each page corresponding to a fixed-length contiguous block of virtual memory, and being associated with a respective state, each state indicating a number of off-chip accesses determined for a respective page, each state being determined based on a query execution plan (QEP) that is executed within the hybrid memory system in response to a query submitted by the application; and
  - executing the application, and, during execution of the application:
    - determining the QEP responsive to the query submitted by the application,
    - identifying at least one page in the sorted list of pages as a page that is to-be-locked based on comparing the state of the at least one page to a threshold,
    - locking the at least one page in main memory to inhibit swapping of the at least one page from main memory by an operating system, and
    - executing the QEP to access the at least one page in the main memory to provide a result.

16. The system of claim 15, wherein the hybrid main memory system comprises at least dynamic random access memory (DRAM) and non-volatile memory (NVM).

17. The system of claim 16, wherein the at least one page is stored in DRAM.

18. The system of claim 16, wherein one or more pages in the sorted list of pages are unlocked during execution of the application, and are stored in NVM.

19. The system of claim 15, wherein each state is determined as a sum of a number of off-chip writes and off-chip reads for the respective page.

20. The system of claim 15, wherein operations further comprise:
- receiving source code of the application;
- providing an instrumented application that includes the source code and instrumentation code, the instrumented application comprising at least one instruction for profiling a plurality of pages;
- executing the instrumented application to process a set of benchmark queries to provide a statistics file, the statistics file indicating, for each page in the plurality of pages, the respective state;
- storing page and state tuples in a list of pages; and
- sorting the list of pages based on state values to provide the sorted list of pages.

* * * * *